United States Patent [19]

Yamamoto et al.

[11] Patent Number: 4,626,870

[45] Date of Patent: Dec. 2, 1986

[54] DUAL DENSITY TWO-SIDED THERMAL HEAD

[75] Inventors: Yoichi Yamamoto, Nara; Yuichirou Mori, Yamatokoriyama, both of Japan

[73] Assignee: Sharp Kabushiki Kaisha, Osaka, Japan

[21] Appl. No.: 638,065

[22] Filed: Aug. 6, 1984

[30] Foreign Application Priority Data

Aug. 25, 1983 [JP] Japan .............................. 58-156722
Aug. 25, 1983 [JP] Japan .............................. 58-156723

[51] Int. Cl.[4] ...................... G01D 15/10; H05B 1/02; B41J 3/20; H01S 4/00

[52] U.S. Cl. ............................ 346/76 PH; 219/216; 400/120; 29/592 R

[58] Field of Search .................. 346/76 PH; 400/120; 219/216; 29/592 R

[56] References Cited

U.S. PATENT DOCUMENTS 4,251,822 2/1981 Hara et al. ...................... 346/139 C

FOREIGN PATENT DOCUMENTS 57-115372 7/1982 Japan ............................ 346/76 PH
58-131077 8/1983 Japan ............................ 346/76 PH
58-212970 12/1983 Japan ............................ 346/76 PH

*Primary Examiner*—E. A. Goldberg
*Assistant Examiner*—Gerald E. Preston
*Attorney, Agent, or Firm*—Birch, Stewart, Kolasch & Birch

[57] ABSTRACT

A thermal head comprises a substrate with a folding line, a first thermal resistor dot line formed on a first side of the substrate in a first density of dots, a second thermal resistor dot line formed on a second side of the substrate in a second density of dots different from the first density, and wiring lines for the first and the second thermal resistor dot lines. The substrate is folded along the folding line to form a dihedral angle.

5 Claims, 6 Drawing Figures

DUAL DENSITY TWO-SIDED THERMAL HEAD

BACKGROUND OF THE INVENTION

The present invention relates to a recoring apparatus and, more particularly, to a thermal head for a recording apparatus of the heat-sensitive printing paper type or the heat transfer type, in which the thermal head is serially scanned in the width direction of a paper.

A conventional thermal resistor for a thermal head comprises a plurality of thermal resistor elements or dots corresponding to a matrix-shape, so that some thermal resistors are heated by selectively applying an electric pulse to produce a thermal pattern representative of a desired character.

Conventionally, to change the size of the character, the matrix size of the thermal head to be used may be altered, for example, to a full size matrix as half size matrix. In such a case, a dot pitch for the small size character is similar to the large dot pitch of the large size character while the dot number of the small character is half that of the large size character, so the printing quality is rather poor.

Alternatively, it may be possible to exchange the thermal head depending the character size, but the exchange is difficult.

SUMMARY OF THE INVENTION

Accordingly, it is an object of the present invention to provide an improved thermal head for recording large and small size characters.

It is another object of the present invention to provide an improved thermal head for changing printing resolution.

It is a further object of the present invention to provide a method for assembling an improved thermal head comprising a pair of groups of different resolution thermal resistors on both sides of a line, so that the thermal head is symmetrically folded along the line.

Briefly described, in accordance with the present invention, a thermal head comprises a substrate with a folding line, a first thermal resistor element line formed on a first side of the substrate in a first density of the elements, a second thermal resistor element line formed on a second side of the substrate in a second density of the elements different from the first density, and wiring lines for the first and the second thermal resistor element lines. The substrate is folded along the folding line to form a dihedral angle.

BRIEF DESCRIPTION OF THE DRAWINGS

The present invention will become more fully understood from the detailed description given hereinbelow and the accompanying drawings which are given by way of illustration only, and thus are not limitative of the present invention and wherein.

DESCRIPTION OF THE INVENTION

Figure 1A:
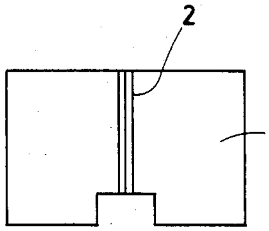
FIGS. 1(A) to 1(C) are front views of the thermal head of the present invention, showing the assembling steps thereof.
Figure 1B:
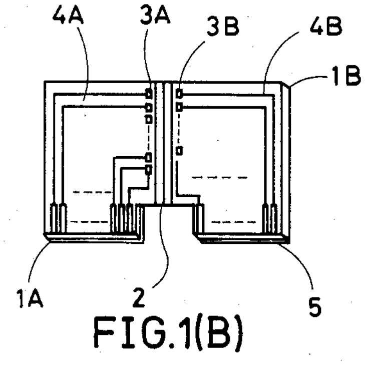
Figure 1C:
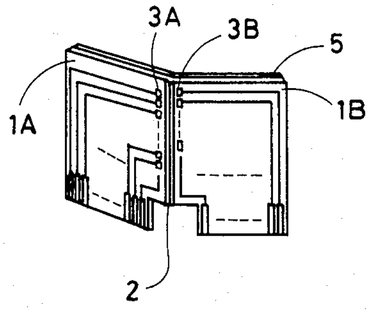

FIGS. 1(A) to 1(C) are front views of a thermal head according to the present invention, showing the steps of assembling the thermal head.

The thermal head is serially scanned in a width direction of a recording paper in a recording apparatus of a heat-sensitive paper or thermal transfer type.

With refence to FIG. 1(A), the thermal head is constructed with a single rectangular substrate 1 made of a ceramic or the like, in which a folding groove 2 in the form of a notch is formed to assist in symmetrically folding the substrate.

With reference to FIG. 1(B), a pair of patterns of thermal resistor element (dot) lines 3A and 3B are formed at a left side 1A and a right side 1B of the substrate 1 on both sides of the folding groove 2, respectively. Each of the thermal resistor dot lines 3A and 3B forms a single vertical-dot line suitable for a recording apparatus in which the thermal resistor line 3A (or 3B) is shifted and scanned as covering full horizontal dots in every character. A wiring pattern 4A for the thermal resistor dot line 3A is formed on the left side 1A while another wiring pattern 4B for the thermal resistor dot line 3B is formed on the left side 1B.

The resolution of the respective thermal resistor dot lines 3A and 3B is different. Preferably, thermal resistors belonging to the thermal resistor dot line 3A are positioned at a density of 8 dots/mm so that 24 vertical dot groups are provided in a vertical line as corresponding to 24 vertical dots in a single character. Thermal resistors of the thermal resistor dot line 3B are provided at another density of 12 dots/mm so that 24 vertical dot groups are arranged as corresponding to 24 vertical dots in a single character. Thus, a single character is recorded in a matrix of $24 \times 24$.

On both sides of the folding groove 2, a pair of thermal resistor dot lines 3A and 3B are symmetrically positioned such that they are in parallel with each other.

A support plate 5 of a stainless or the like with a thickness of about 0.1 mm is adhered with an adhesive to the rear side of the substrate 1 after the formation of the pair of patterns of the thermal resistor dot lines 3A and 3B.

As shown in FIG. 1(C), the substrate 1 is folded along the folding groove 2 at a dihedral angle. The view of FIG. 1(C) depicts the final assembly of the thermal head of the present invention.

Figure 2:
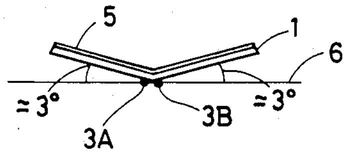
FIG. 2 is a plan view of the thermal head of the present invention.

FIG. 2 is a plan view of the thermal head, showing the dihedral angle between the plane of the substrate 1 and a reference tangential line to the folding boundary.

Each of the left side 1A and the right side 1B of the substrate 1 is folded at a dihedral angle of about 3 degrees between the plane of the sustrate 1 and a reference tangential line 6. The dihedral angle is not limited to 3°, but it is preferable that each of the thermal resistor dot lines 3A and 3B is somewhat inclined to be in uniform contact with the flat recording paper. The substrate 1 is folded so that the surface carrying the support plate 5 is faces inward while the other surface carrying the thermal resistor dot lines 3A and 3B is faces outward. With the help of the support plate 5 on the rear side of the substrate 1, both sides of the substrate 1 can be folded for protection without any separation.

Figure 3:
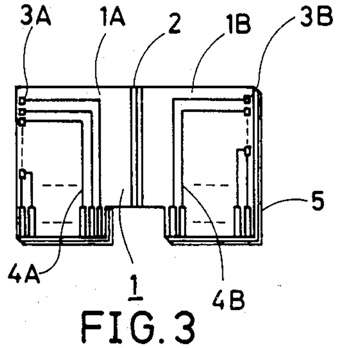
FIG. 3 is a front view of another thermal head according to the present invention.
Figure 4:
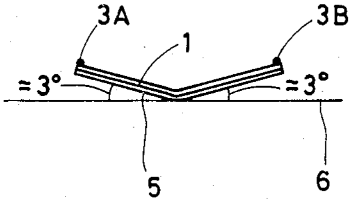
FIG. 4 is a plan view of the thermal head of FIG. 3.

FIGS. 3 and 4 are views of another embodiment according to the present invention.

The format of FIG. 3 is substantially identical to that of FIG. 1(B) except that the thermal resistor dot lines 3A and 3B are aligned far from the folding groove 2 and near the opposing side of the substrate 1 with symmetry. As can be seen in FIG. 4, the substrate 1 is folded similar to that of FIG. 2 except that the surface carrying the thermal resistor dot lines 3A and 3B faces inward while the other surface carrying the support plate 5 faces outward.

In FIG. 4, the substrate 1 is folded at a dihedral angle of about 3 degrees between the substrate 1 and the tangential line 6, although 3° is not limitive of the angle. Each of the thermal resistor dot lines 3A and 3B faces the recording paper while being in uniform contact with the paper.

Each of the thermal resistor dot lines 3A and 3B is selectively heated to change the resolution and the character size. Since every thermal resistor dot line 3A (or 3B) is carried on a different side, good heat radiation can be expected to assure good printing property.

In the above preferred embodiment of the present invention, the support plate 5 is formed after the formation of the pattern of the thermal resistor dot lines 3A and 3B. It may be possible to form the support plate 5 prior to the formation. In the above description, the folding groove 2 is first formed at the center of the substrate 1, and then the pair of patterns of the thermal resistor dot lines 3A and 3B are formed. However, it may possible that a folding line is formed at the center with reference to which the pair of patterns of the thermal resistor dot lines 3A and 3B are formed, and, then, a notch is provided along the folding line to fold the substrate 1. Further, the single substrate 1 is first prepared for providing a pair of sides of the left side 1A and the right side 1B. It may be further possible to first prepare a single substrate having a predetermined dihedral angle on which a pair of separated pieces may be adhered to complete the substrate.

The number of each of the thermal resistor dot lines 3A and 3B should not limited to one. A plurality of lines of the thermal resistor dot line 3A (or 3B) may be possible.

While only certain embodiments of the present invention have been described, it will be apparent to those skilled in the art that various changes and modifications may be made therein without departing from the spirit and scope of the present invention as claimed.

What is claimed is:

1. A thermal head for a recording apparatus comprising:
   - a substrate having first and second sides;
   - a first vertical thermal resistor line formed on said first side of said substrate, said first thermal resistor line including a plurality of thermal resistors vertically aligned in a first density;
   - a second vertical thermal resistor line formed on said second side of said substrate, said second thermal resistor line including a plurality of thermal resistors vertically aligned in a second density different from that of said first density of said first thermal resistor line; and
   - wiring means for said first and said second vertical thermal resistor lines;
   - said substrate being folded between said first and second sides to form a dihedral angle.

2. The head of claim 1, wherein a folding line is formed on said substrate.

3. The head of claim 1, further comprising a support plate for supporting said substrate.

4. The head of claim 1, wherein said dihedral angle is about 3 degrees between the plane of said substrate and a reference tangential plane of the folding boundary of said substrate.

5. A method for assembling a thermal head comprising the steps of:
   - preparing a substrate providing a first and second sides;
   - forming a first vertical thermal resistor line comprising a plurality of thermal resistors on said side of said substrate vertically aligned in a first density;
   - forming a second vertical thermal resistor line comprising a plurality of thermal resistors vertically aligned on said second side of said substrate in a second density different from that of said first density;
   - forming a wiring for said first and said second thermal resistor lines; and
   - folding the substrate at the boundary between said first and said second thermal resistor lines.

* * * * *